(12) United States Patent
Kumazawa et al.

(10) Patent No.: US 9,812,939 B2
(45) Date of Patent: Nov. 7, 2017

(54) LINEAR MOTOR SYSTEM

(71) Applicant: Murata Machinery, Ltd., Kyoto-shi, Kyoto (JP)

(72) Inventors: Tsuyoshi Kumazawa, Inuyama (JP); Atsuo Nagasawa, Inuyama (JP)

(73) Assignee: MURATA MACHINERY, LTD., Kyoto (JP)

( * ) Notice: Subject to any disclaimer, the term of this patent is extended or adjusted under 35 U.S.C. 154(b) by 0 days.

(21) Appl. No.: 15/171,874

(22) Filed: Jun. 2, 2016

(65) Prior Publication Data
US 2017/0054400 A1    Feb. 23, 2017

(30) Foreign Application Priority Data

Aug. 21, 2015 (JP) ................. 2015-163522
Dec. 18, 2015 (JP) ................. 2015-247085

(51) Int. Cl.
*H02K 41/00* (2006.01)
*H02K 41/03* (2006.01)
*H02P 25/06* (2016.01)

(52) U.S. Cl.
CPC ............ *H02K 41/03* (2013.01); *H02P 25/06* (2013.01)

(58) Field of Classification Search
CPC ................... G05B 19/414; H02P 25/06
See application file for complete search history.

(56) References Cited

U.S. PATENT DOCUMENTS

| 6,381,523 B2 | 4/2002 | Sone |
| 8,796,959 B2 | 8/2014 | Sato |
| 9,505,560 B2 * | 11/2016 | Kleinikkink ........... G05B 19/00 |

FOREIGN PATENT DOCUMENTS

| JP | 01-288910 A | 11/1989 |
| JP | 09-208051 A | 8/1997 |
| JP | 2009-187239 A | 8/2009 |
| WO | 2010-024234 A1 | 3/2010 |

* cited by examiner

*Primary Examiner* — Karen Masih
(74) *Attorney, Agent, or Firm* — DLA Piper LLP (US)

(57) ABSTRACT

A linear motor system includes a plurality of armatures that are disposed along a movement path of a mover continuously or discretely, a detector that detects position information of the mover in the movement path, zone controllers that are provided to a plurality of unit zones of the movement path in one-to-one correspondence and control the armatures disposed on the unit zones, respectively, and an integrated controller that supplies a traveling instruction of the mover to the plurality of zone controllers provided to the movement path based on the position information detected by the detector and totally controls the plurality of zone controllers. The zone controllers determine whether the mover to be driven is present in the related unit zones based on the traveling instruction, and control the plurality of armatures based on determined results.

15 Claims, 13 Drawing Sheets

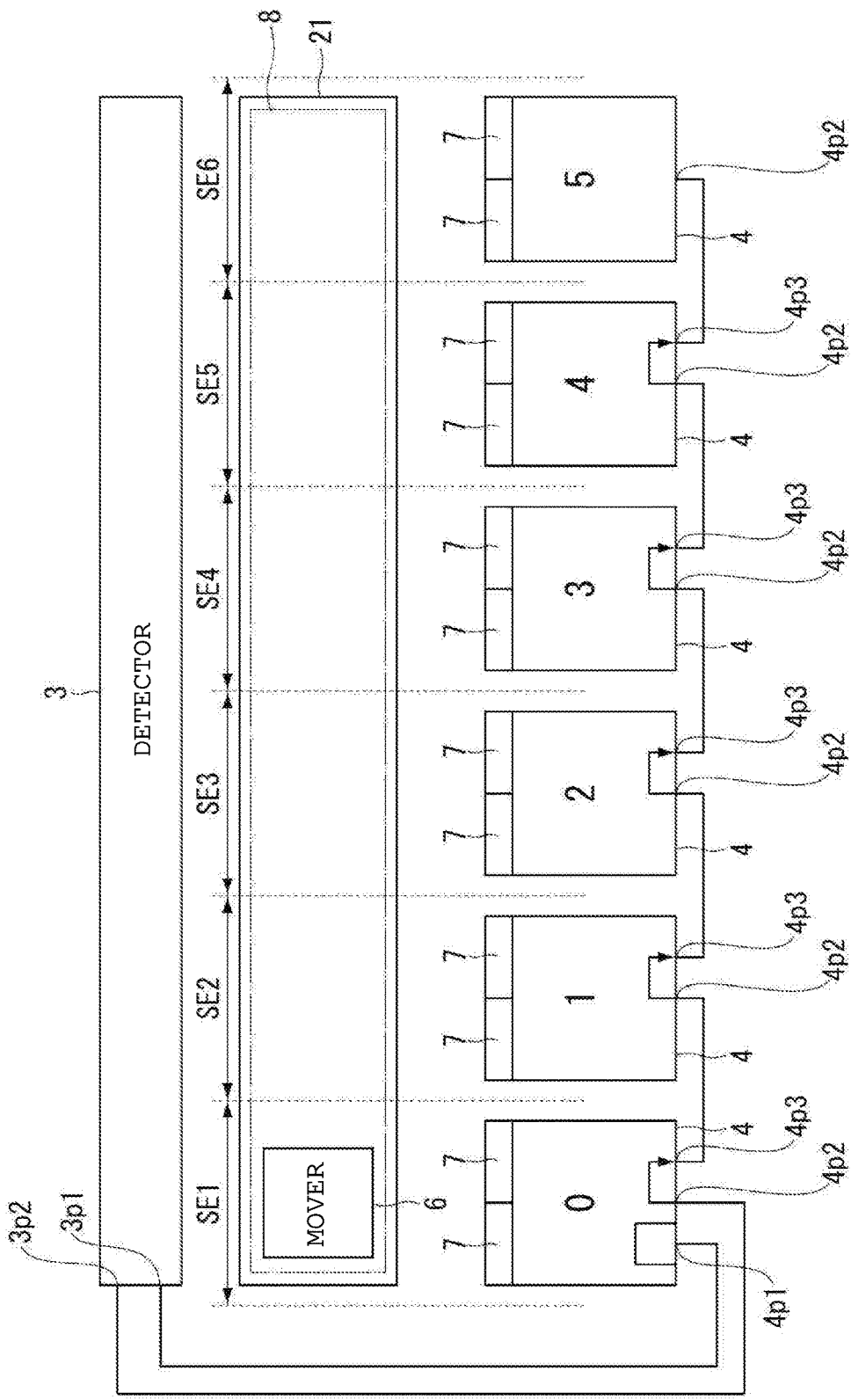

LINEAR MOTOR SYSTEM

CROSS-REFERENCE TO RELATED APPLICATIONS

This application claims priority under 35 U.S.C. 119 to Japanese Patent Applications No. 2015-163522, filed on Aug. 21, 2015 and No. 2015-247085, filed on Dec. 18, 2015, both of which applications are hereby incorporated by reference in their entirety.

BACKGROUND OF THE INVENTION

1. Field of the Invention

The present invention relates to a linear motor system.

2. Description of Related Art

Linear motor systems have been widely employed in conveyor carriages of physical distributing apparatuses, transport apparatuses acting as machine tool loaders, or the like in order to drive the apparatuses. A ground primary linear motor system is proposed as the linear motor system in which a primary coil is disposed on a fixing side (for example, a ground side) and a permanent magnet is disposed on a mover side (for example, see U.S. Pat. No. 8,796,959 and WO2010/024234). In the linear motor system, for example, motor controllers control a plurality of motors, and an integrated controller controls the plurality of motor controllers. A magnetic sensor that detects a position of a mover acting as a magnet array is disposed between the motors. The integrated controller specifies a motor controller that is suitable for a position of a mover based on a result detected by the magnetic sensor, and supplies a control instruction (traveling command) to the specified motor controller.

When control is complicated in the linear motor system, it is occasionally difficult to allow the mover to stably travel. For example, since a number of the motor controllers to be allocated to one integrated controller is limited, the system is enlarged and the number of motors increases in some cases. In this case, for example, a host controller (a linear controller) is provided to the plurality of integrated controllers, and the host controller totally controls the plurality of integrated controllers. When the mover lies across a zone associated with one integrated controller and a next zone, a delay of a signal might occur between one integrated controller and an integrated controller for the next zone due to a difference of an information transmission path. The occurrence of such a signal delay causes a control variation, a delay, and an increase/decrease in a load according to a position, and thus a smooth transfer of the mover is hindered.

BRIEF SUMMARY OF THE INVENTION

According to the present invention, for example, even when a size of a linear motor system is enlarged, a mover can be moved smoothly.

A linear motor system according to a preferable aspect of the present invention includes a plurality of armatures that are disposed along a movement path of a mover continuously or discretely, a detector that detects position information of the mover in the movement path, zone controllers that are provided to a plurality of unit zones of the movement path in one-to-one correspondence and control the armatures disposed on the unit zones, respectively, and an integrated controller that collectively supplies an identical traveling instruction relating to the movers to the plurality of zone controllers provided to the movement path based on the position information detected by the detector and totally controls the plurality of zone controllers. The zone controllers determine whether the mover to be driven is present in the related unit zones based on the traveling instruction, and control the plurality of armatures based on determined results.

Further, when the mover is not present in the related unit zones, the zone controllers may determine whether the mover related to a next traveling instruction is moving toward the related unit zones.

Further, when the zone controllers may determine whether the mover related to the next traveling instruction is moving toward the related unit zones based on the previous traveling instruction.

Further, when the determination is made that the mover related to the next traveling instruction is moving toward the related unit zones, the zone controllers may store electric powers to be supplied to the plurality of armatures in advance.

Further, when determining that the mover related to the next traveling instruction does not move toward the related unit zones, the zone controllers may ignore the traveling instruction.

Further, the plurality of zone controllers obtain the position information detected by the detector, and supplies at least a part of the obtained position information to the integrated controller. The integrated controller may supply the position information obtained from the plurality of zone controllers to the plurality of zone controllers, respectively.

Further, the integrated controller may supply the position information obtained from the plurality of zone controllers as well as the next traveling instruction to the plurality of zone controllers.

Further, the integrated controller may include an area controller that is provided correspondingly to the zone controllers of the two or more unit zones sequentially disposed on movement path, and a system controller that supplies a common instruction including the traveling instruction to the zone controllers related to the area controller via the area controller.

Further, the zone controllers related to the area controller obtain the position information detected by the detector, and supply at least a part of the obtained position information to the system controller via the area controller. The system controller may supply the position information obtained from the zone controllers related to the area controllers to the zone controllers related to the area controller via the area controller.

Further, the zone controllers related to the area controller may be connected to each other by a daisy chain mode.

Further, the integrated controller generates a current instruction representing values of the electric currents to be supplied to the armatures as the traveling instruction. The zone controllers may control whether the electric currents whose values are determined by the current instruction is to be supplied to the armatures based on the result of determining whether the mover to be driven is present in the related unit zones.

Further, the integrated controller may supply the traveling instruction to the plurality of zone controllers on the first cycle based on the position information detected by the detector. The zone controllers may determine whether the electric currents are supplied to the armatures on a second cycle that is shorter than the first cycle based on the position information detected by the detector.

Further, the integrated controller may include a position controller that generates a speed instruction representing a target speed of the mover on the first cycle based on the position instruction representing the target position of the mover and the position information supplied from the detector, and a speed controller that generates the current instruction on the first cycle based on the speed information of the mover generated from the speed instruction and the position information supplied from the detector.

Further, each of the zone controllers may include a current controller that sets a value of the electric current to be supplied to the armature to a value determined by the current instruction, and a switching element that switches a state of the path of the electric current to be supplied to the armature between a conductive state and a cutoff state. The switching element may control the switching between the conductive state and the cutoff state in the second cycle based on the position information supplied from the detector.

In the linear motor system of the present invention, an identical traveling instruction about the movers is collectively supplied to the plurality of zone controllers in parallel, and the zone controllers control the plurality of armatures based on the result of determining whether the mover to be driven is present in the related unit zones. Therefore, the integrated controller does not have to select the zone controllers to which the traveling instruction is supplied, and thus the control can be simplified. Therefore, even when, for example, the system is enlarged, a control variation, a delay and an increase/decrease in a load can be suppressed, so that the mover can be made to smoothly travel. Further, since the zone controllers determine whether the mover to be driven is present, for example, when a plurality of movers is used, positions and speeds of the respective movers can easily be varied, and the positions and the speeds of the movers can be controlled in various ways.

Further, when the mover is present in the related unit zones, the zone controllers control electric powers to be supplied to the plurality of armatures according to the traveling instruction. In this case, the mover can smoothly travel in the related zones.

Further, when the mover is not present in the related unit zones, the zone controllers determine whether the mover related to a next traveling instruction is moving toward the related zone units. In this case, the plurality of armatures can be controlled according to whether the mover related to the next traveling instruction is moving toward the related zone units, and thus the mover can smoothly travel.

Further, the zone controllers determine whether the mover related to the next traveling instruction is moving toward the related unit zones based on the previous traveling instruction. In this case, the determination can be made before the next traveling instruction is supplied, and for example, a delay can be suppressed.

Further, when the determination is made that the mover related to a next traveling instruction is moving toward the related unit zone, the zone controllers store electric powers to be supplied to the plurality of armatures in advance. In this case, when the mover enters the related unit zones, the electric powers can be smoothly supplied to the plurality of armatures, and the mover can smoothly travel.

Further, when determining that the mover related to a next traveling instruction is not moving toward the related unit zones, the zone controllers may ignore the traveling instruction.

Further, the plurality of zone controllers obtain the position information detected by the detector, and supplies at least apart of the obtained position information to the integrated controller. The integrated controller supplies the position information obtained from the plurality of zone controllers to the plurality of zone controllers. In this case, for example, the zone controllers can use the position information from the detector for the control of the plurality of armatures, and the integrated controller can use the position information from the zone controllers for the next traveling instruction.

Further, the integrated controller supplies the position information obtained from the plurality of zone controllers as well as the next traveling instruction to the plurality of zone controllers. In this case, the plurality of zone controllers can control the plurality of armatures using the common position information from the integrated controller, and thus the mover can be made to smoothly travel.

Further, the integrated controller includes area controllers that are provided correspondingly to the zone controllers in the two or more unit zones sequentially disposed on movement path, and a system controller that supplies a common instruction including the traveling instruction to the zone controllers related to the area controllers via the area controllers. In this case, the system controller increases the number of the controllable zone controllers so as to be capable of coping with the enlargement of the system.

Further, the zone controllers related to the area controllers obtain the position information detected by the detector, and supply at least a part of the obtained position information to the system controller via the area controllers. The system controller supplies the position information obtained from the zone controllers related to the area controllers to the zone controllers related to the area controllers via the area controllers. In this case, the position information from the detector can be used for the control of the plurality of armatures, and the integrated controller can use the position information from the zone controllers for the next traveling instruction.

Further, the zone controllers related to the area controllers can control the plurality of armatures using the common position information from the area controllers, and thus the mover can be made to smoothly travel.

Further, the zone controllers related to the area controllers are connected to each other by the daisy chain mode. In this case, the zone controller can be easily annexed, and easily copes with the enlargement of the system.

Further, the integrated controller generates a current instruction representing a value of the electric current to be supplied to the armatures as the traveling instruction. The zone controllers control whether the electric current whose value is determined by the current instruction is supplied to the armatures based on results of determining whether the mover to be driven is present in the related unit zones. In this case, the zone controllers can quickly control whether the electric current is supplied to the armatures, and a delay of a response of the armatures to the positions of the armatures can be reduced. For this reason, the mover can be made to smoothly travel.

Further, the integrated controller supplies the current instruction to the plurality of zone controllers on the first cycle based on the position information detected by the detector. The zone controllers determine whether the electric current is supplied to the armatures based on the position information detected by the detector on the second cycle that is shorter than the first cycle. In this case, the zone controllers determine whether the electric current is supplied to the armatures on the second cycle that is shorter than the first cycle in which the traveling instruction is supplied. For this reason, the mover can be made to smoothly travel.

Further, the integrated controller includes a position controller that generates a speed instruction representing a target speed of the mover on the first cycle based on the position instruction representing the target position of the mover and the position information supplied from the detector, and a speed controller that generates the current instruction on the first cycle based on the speed information of the mover generated from the speed instruction and the position information supplied from the detector. In this case, the position controller generates the speed instruction based on the position information, and the speed controller generates the current instruction based on the speed instruction. For this reason, the current instruction that is appropriate for the target position of the mover can be generated, and for example, the processes to be executed by the zone controllers can be reduced. Therefore, the zone controller can quickly control whether the electric current is supplied to the armatures.

Further, each of the zone controllers includes a current controller that sets a value of the electric current to be supplied to the armatures to a value determined by the current instruction, and a switching element that switches a state of the path of the electric current to be supplied to the armatures between a conductive state and a cutoff state. The switching element controls the switching between the conductive state and the cutoff state on the second cycle based on the position information supplied from the detector. In this case, for example, the current controller can set the value of the electric current without using the position information, and the switching element can switch the supply of the electric current to the armatures without using the information about the value of the electric current to be supplied to the armatures. For this reason, the zone controllers can make the control quickly.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 3 is a diagram illustrating the detector, a mover, and a zone controller;

DETAILED DESCRIPTION OF PREFERRED EMBODIMENTS

First Embodiment

Figure 1:
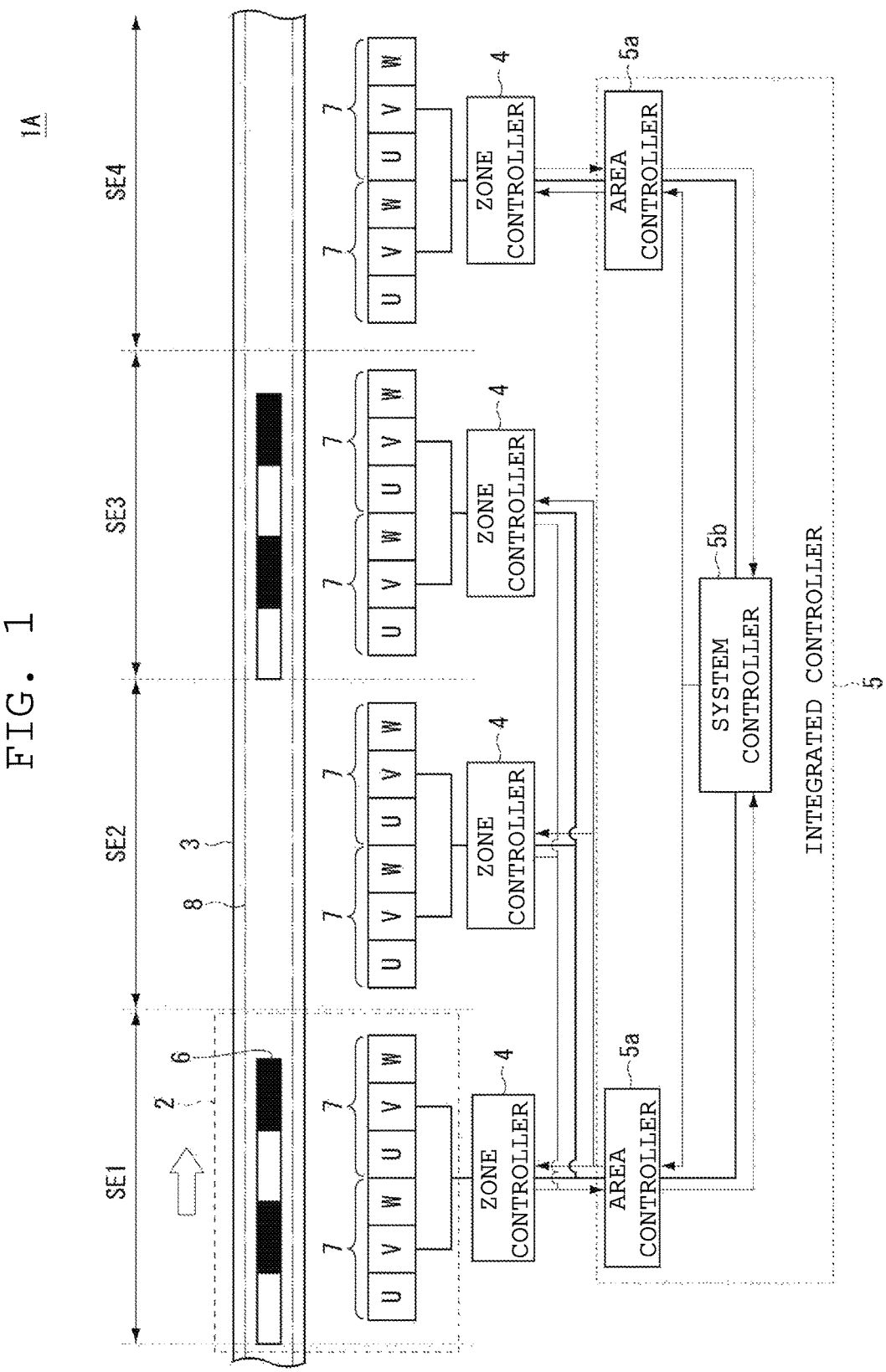
FIG. 1 is a conceptual diagram illustrating a linear motor system according to a first embodiment.

A first embodiment is described below. FIG. 1 a conceptual diagram illustrating a linear motor system 1A according to a first embodiment. The linear motor system 1A includes linear motors 2, a detector 3, zone controllers 4, and an integrated controller 5. The linear motor system 1A operates schematically as follows. The linear motors 2 include a mover 6 and armatures 7. The mover 6 generates a magnetic field and is moved along a movement path 8 by a Lorentz force with respect to an electric field generated from the armatures 7. The detector 3 detects position information of the mover 6 in the movement path 8. The zone controllers 4 are provided to a plurality of unit zones (SE1 to SE4) of the movement path 8 in one-to-one correspondence. The integrated controller 5 supplies a traveling instruction of the mover 6 to the plurality of zone controllers 4 provided to the movement path 8 in parallel based on the position information detected by the detector 3, and totally controls the plurality of zone controllers 4. For example, when a plurality of movers 6 is provided, the integrated controller 5 transmits a single traveling instruction obtained by bundling traveling instructions of the plurality of movers 6 to all the zone controllers 4 collectively and simultaneously. The zone controllers 4 determine whether the mover 6 to be driven is present in the related unit zones, respectively, based on the traveling instructions, and control the plurality of armatures 7 based on the determined results. Respective sections of the linear motor system 1A are described in detail below.

Figure 2A:
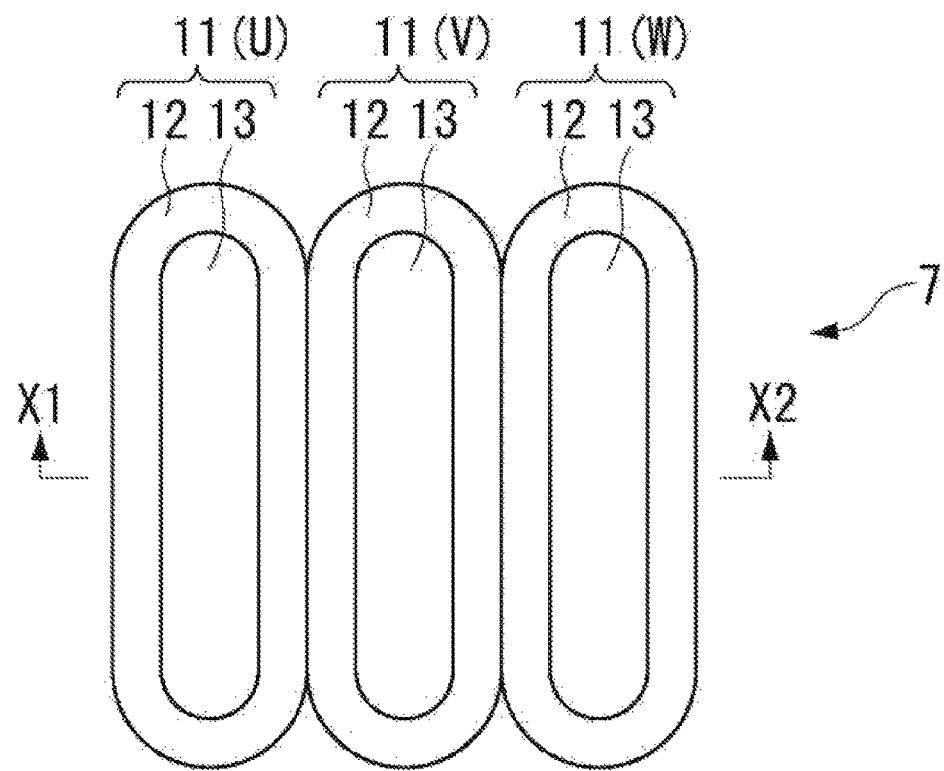
FIG. 2A to FIG. 2C are diagrams illustrating a linear motor and a detector.
Figure 2B:
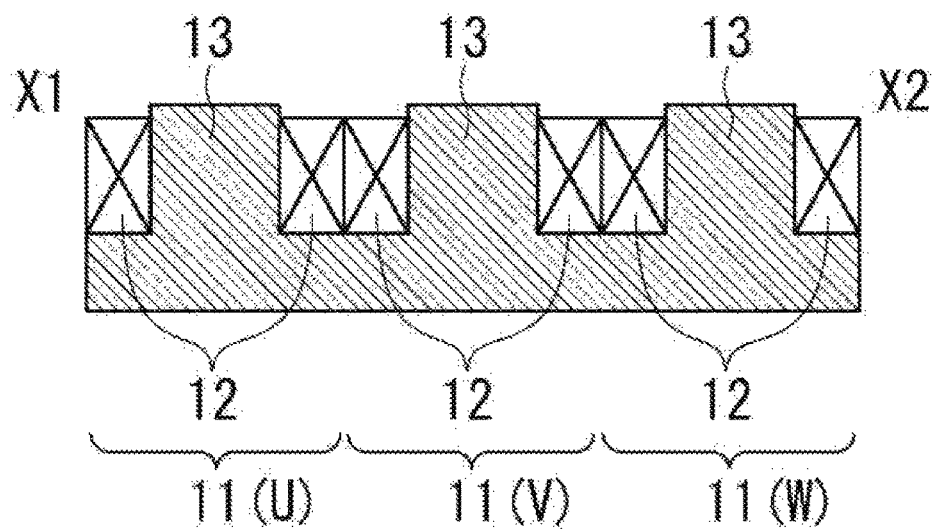
Figure 2C:
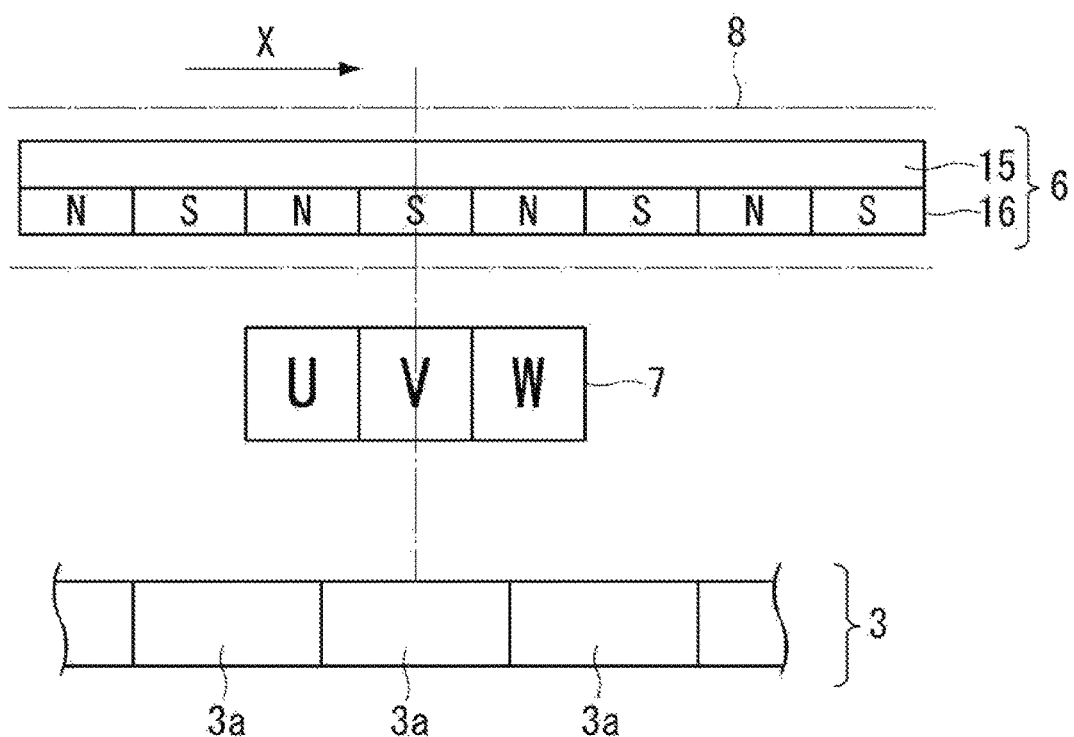

FIG. 2A to FIG. 2C are diagrams illustrating the linear motors 2 and the detector 3. The linear motor 2 (see FIG. 2C) is driven by a three-phase (a U phase, a V phase, and a W phase) alternating current or a direct current. As illustrated in FIG. 2A, the armature 7 includes three magnetic poles 11 linearly disposed parallel with a moving direction X of the mover 6. In the respective drawings to be used for description of the embodiments, the magnetic poles corresponding to the U phase, the V phase, and the W phase are represented by U, V, and W, respectively. Each of the three magnetic poles 11 includes a coil 12 and a core 13. As illustrated in FIG. 2B, the cores 13 protrude from a common main body section into a comb-tooth shape. The coils 12 are disposed between the cores 13. The linear motor 2 may be provided with a plurality of magnetic poles correspondingly to the U phase, the V phase, and the W phase, and the armature 7 may have magnetic poles whose number is an integer multiple of the number of the phases.

As illustrated in FIG. 2C, the mover 6 includes a base portion 15 and a magnet portion 16 disposed on the base portion 15. The magnet portion 16 is, for example, a permanent magnet, and is configured so that N poles and S poles are arranged alternately. The mover 6 moves along the movement path 8 according to a magnetic force generated from the armature 7. The movement path 8 is defined by, for example, a linear guide. The armatures 7 are disposed along the movement path 8 of the mover 6 continuously or discretely (illustrated later in FIGS. 8A to 8C). The detector 3 detects position information of the mover 6 in the movement path 8. The position information of the mover 6 includes at least one of a position (for example, a coordinate), a speed, and an acceleration of the mover. The detector 3 is, for example, a magnetic linear scale. The detector 3 has a plurality of sensor elements 3a disposed along the moving direction X of the mover 6. The sensor elements 3a are, for example, magnetic sensors, and detect a magnetic force from the mover 6. The detector 3 may detect the position information of the mover 6 optically or electrostatically. The sensor elements 3a may be disposed along the movement path 8 continuously (close to each other), or may be disposed along the movement path 8 discretely (spaced from each other).

FIG. 3 is a diagram illustrating the detector 3, the mover 6, and the zone controllers 4. The zone controllers 4 are provided in one-to-one correspondence to a plurality of unit zones (SE1 to SE6) of the movement path 8 (to the unit zones individually). The unit zone is a zone where the armature 7 to be controlled by one zone controller 4 is disposed in the movement path 8. A range of one unit zone is such that an integer number (for example, two) of the armatures 7 are disposed. The number of the armatures 7 to be disposed in one unit zone may be one, or three or more. The zone controller 4 is, for example, an amplifier (a servo amplifier), and controls an electric current to be supplied to the armature 7. The zone controller 4 includes, for example, a high-current (power) motor driving circuit (not illustrated) that supplies an electric current to the armature 7 (hereinafter, a motor current), and a low-current (signal) control circuit (not illustrated) that controls the motor driving circuit. The high-current motor driving circuit is formed by an inverter including a plurality of switching elements mounted therein, and is connected to a driving DC power supply (not illustrated). The low-current control circuit is formed by a microcomputer, a circuit element, and a non-volatile memory. The microcomputer, for example, reads a program stored in the non-volatile memory, and executes various processes according to this program.

The mover 6 is guided by a guide 21 and moves along the movement path 8. That is to say, the guide 21 defines the movement path 8. The movement path 8 has a linear shape in FIG. 3, but may have a curved-line shape, or may include a linear portion and a curved-line portion. The detector 3 is provided, for example, over a plurality of unit zones, but may be provided to the movement path 8 discretely. For example, the position information of the mover 6 may be calculated by interpolating discrete data. The detector 3 has an input terminal 3p1 and an output terminal 3p2. The input terminal 3p1 receives a synchronous signal that represents a timing at which the detector 3 detects the position information of the mover 6. The output terminal 3p2 outputs a detection signal that represents a result obtained in a manner such that the detector 3 detects the position information of the mover 6.

The plurality of zone controllers 4 is connected to be communicable with the detector 3 by, for example, a daisy chain mode. In FIG. 3, the plurality of zone controllers 4 is numbered 0, 1, 2, . . . 5 from an upstream (a start terminal) to a downstream (an end terminal) of the daisy chain connection. The zone controller 4 with number 0 to the zone controller 4 with number 5 are connected sequentially by serial communication such as RS422. The zone controller 4 with number 0 has a synchronous terminal 4p1, an input terminal 4p2, and an output terminal 4p3. The zone controller 4 with number 0 is a master, and outputs a synchronous signal from the synchronous terminal 4p1. The synchronous terminal 4p1 is connected to the input terminal 3p1 of the detector 3. In the zone controller 4 with number 0, the input terminal 4p2 is connected to the output terminal 3p2 of the detector 3, and the output terminal 4p3 is connected to the input terminal 4p2 of the zone controller 4 on a downstream side (number 1). In each of the zone controllers 4 with number 1 to number 5 on the downstream side, the input terminal 4p2 is connected to the output terminal 4p3 of the zone controller 4 on the upstream side, and the output terminal 4p3 is connected to the input terminal 4p2 of the zone controller 4 on the downstream side. The output terminal of the zone controller 4 with number 5 (not illustrated) is terminated by, for example, a termination resistor. When the zone controller 4 with number 0 outputs a synchronous signal from the synchronous terminal 4p1 to the input terminal 3p1 of the detector 3, the detector 3 detects the position information of the mover 6. The detector 3 outputs the detection signal from the output terminal 3p2 to the input terminal 4p2 of the zone controller 4 with number 0. The zone controller 4 with number 0 outputs a detection signal from the output terminal 4p3 to the input terminal 4p2 of the zone controller 4 with number 1. Similarly, detection signals are sequentially supplied from the zone controllers 4 on the upstream side to the zone controllers 4 on the downstream side. As described above, the daisy-chain-connected zone controllers 4 as one system can share the detected result of the position information about the mover 6.

Back to the description with reference to FIG. 1, the integrated controller 5 includes area controllers 5a and a system controller 5b. The area controllers 5a are provided correspondingly to the zone controllers 4 of two or more unit zones sequentially disposed on movement path 8. For example, in FIG. 1, the unit zone SE1, the unit zone SE2, and the unit zone SE3 are sequentially disposed along the movement path 8. The area controller 5a is connected to be communicable with the zone controller 4 related to the unit zone SE1, the zone controller 4 related to the unit zone SE2, and the zone controller 4 related to the unit zone SE3. The zone controllers 4 related to the area controller 5a are connected to each other by, for example, the daisy chain mode, and the zone controller 4 on a most upstream side is connected to the area controller 5a. The zone controller 4 on a most downstream side in the daisy chain connection is connected to be communicable with the area controller 5a via, for example, the zone controller 4 on the upstream side.

The number of the zone controllers 4 to be allocated to one area controller 5a is set to any value such as 1 or more to 6 or less within a limited range of a communication device. The number of the area controllers 5a is any value, and is set to any value according to, for example, an upper limit number of the zone controllers 4 allocatable to one area controller 5a and the number of the zone controllers 4. When, for example, the number of the zone controllers 4 exceeds the upper limit number of the zone controllers 4 allocatable to one area controller 5a, the area controller 5a is annexed, and the unallocated zone controller 4 may be connected to the annexed area controller 5a.

The system controller 5b is connected to be communicable with the area controller 5a by, for example, a LVDS (Low Voltage Differential Signaling) method. The system controller 5b supplies a common instruction including a traveling instruction (a bundle of the traveling instructions to all the zone controllers 4) to the plurality of zone controllers 4 related to the area controller 5a via the area controller 5a. For example, the system controller 5b transmits the traveling instruction to the area controller 5a. The area controller 5a transmits the traveling instruction from the system controller 5b to the plurality of zone controllers 4 connected to a self device.

The system controller 5b generates a traveling instruction based on the position information detected by the detector 3. For example, the zone controllers 4 transmit the position information of the movers 6 obtained from the detector 3 to the area controllers 5a. The area controllers 5a transmit the position information of the movers 6 obtained from the zone controllers 4 to the system controller 5b. The system controller 5b generates a bundle of next traveling instructions for all the zone controllers 4 based on the position information obtained via the zone controllers 4 and the area controllers 5a, so as to supply the bundle of the generated traveling instructions to the zone controllers 4 via the area controllers 5a.

Figure 4:
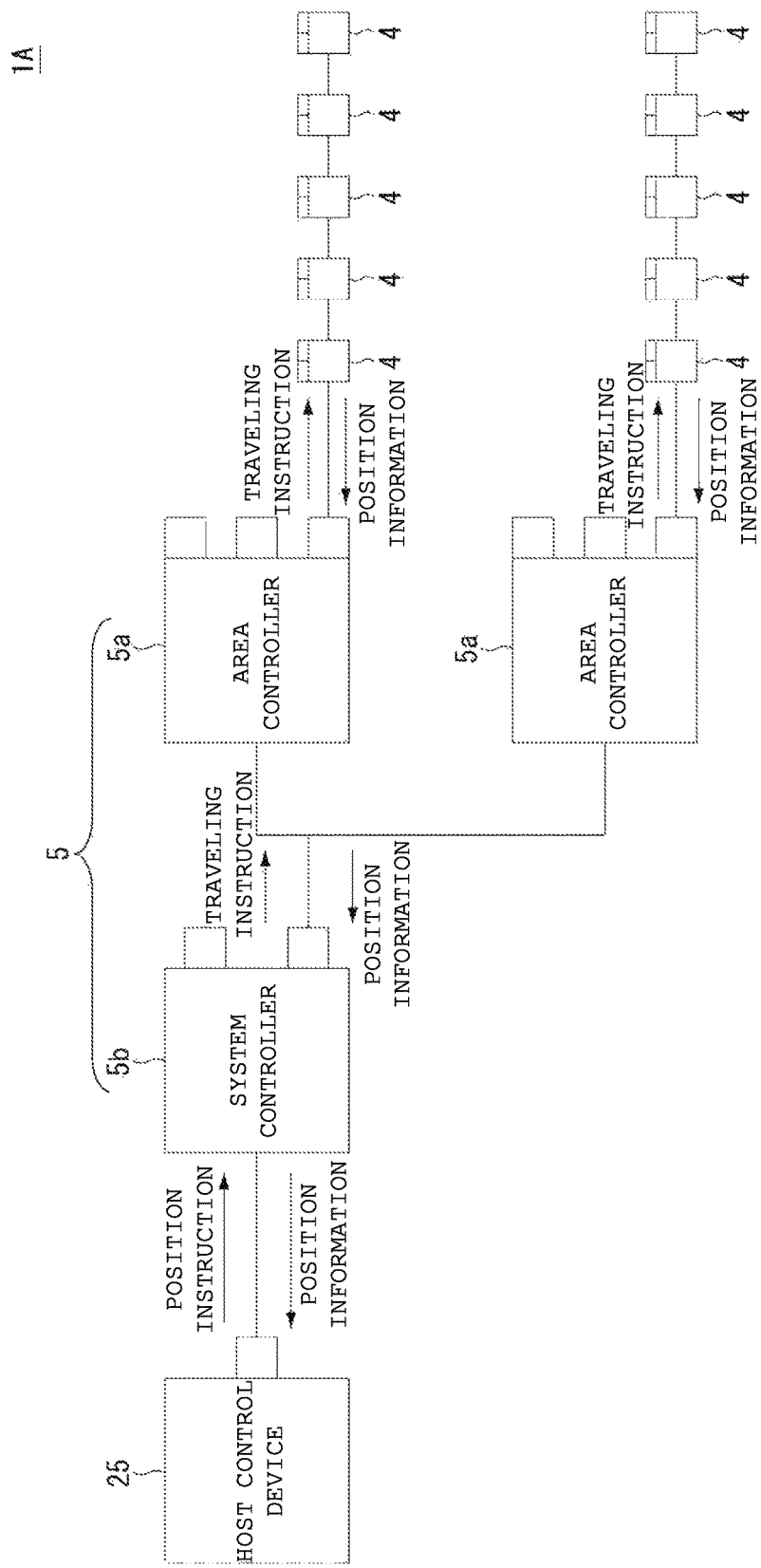
FIG. 4 is a diagram illustrating a flow of an instruction and position information in the linear motor system.
Figure 5:
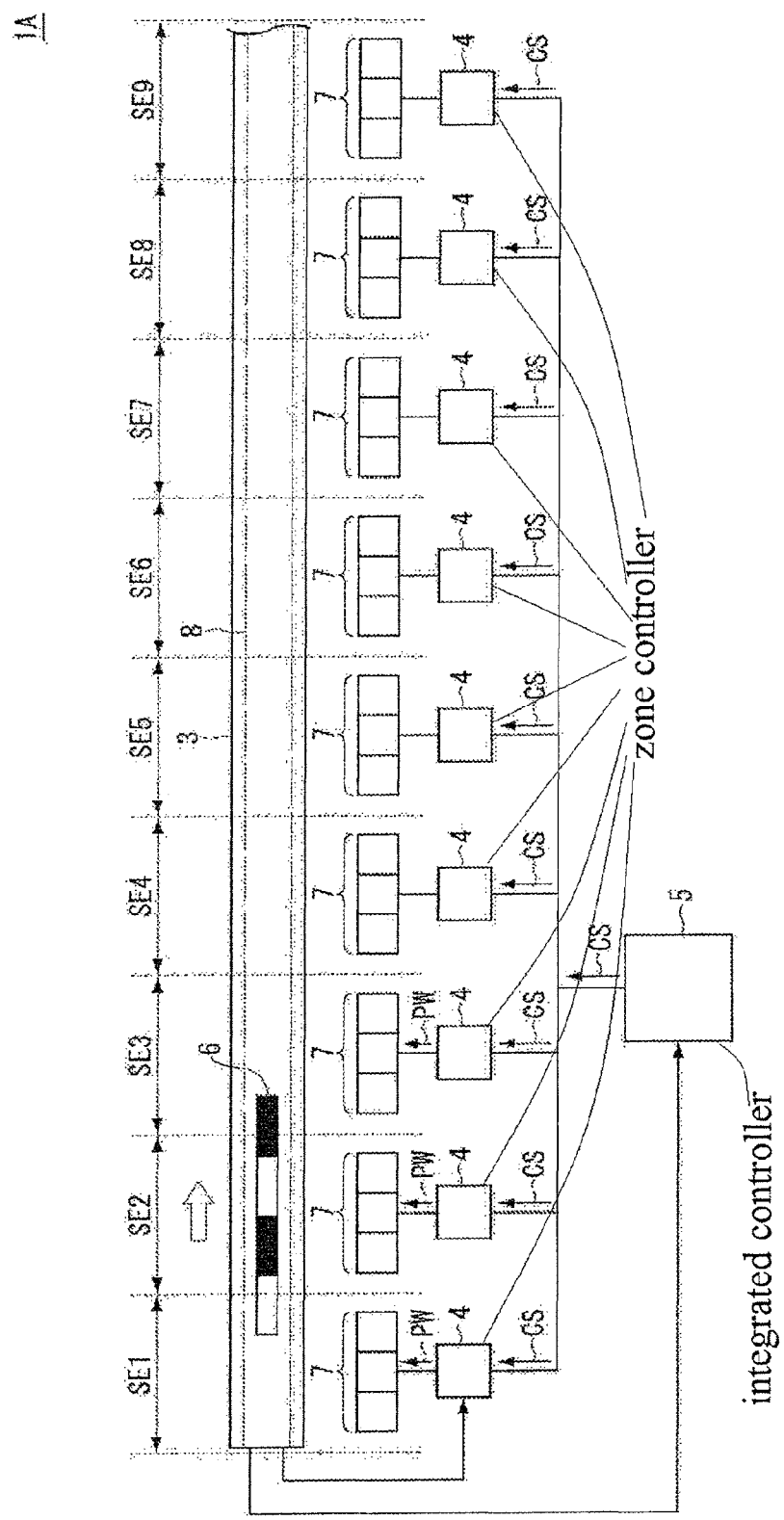
FIG. 5 is a conceptual diagram illustrating an operation of the linear motor system.

FIG. 4 is a diagram illustrating a flow of the instruction and the position information in the linear motor system 1A. FIG. 5 is a conceptual diagram illustrating an operation of the linear motor system 1A. The system controller 5b is connected so as to be communicable with, for example, a host control device (a host controller). The host control device 25 supplies position instructions for specifying target positions of the movers 6 to the system controller 5b based on, for example, preset moving patterns and moving rules of the movers 6, or an instruction form an operator. The host control device 25 supplies the position instructions to the system controller 5b on a predetermined first cycle (for example, 1.0 ms). The host control device 25 may be a part of the linear motor system 1A, or may be an apparatus outside the linear motor system 1A.

The system controller 5b obtains the position information of the movers 6 from the plurality of zone controllers 4 (a zone controller group) via the area controllers 5a. The system controller 5b generates traveling instructions including a position instruction and a speed instruction of the movers 6 based on the position instruction from the host control device 25 and the position information of the movers 6. The speed instruction is the instruction in which the target speed of the mover 6 is determined. The system controller 5b generates traveling instructions every time receiving position instructions from the host control device 25. The system controller 5b supplies a traveling instruction to at least the area controller 5a related to a unit zone where the mover 6 is currently traveling in the area controllers 5a on the first cycle (for example, 1.0 ms). Further, the system controller 5b supplies previous position information supplied from the zone controllers 4 as well as the traveling instructions to the area controllers 5a. The area controllers 5a supply the traveling instructions and the position information from the system controller 5b on the first cycle (for example, 1.0 ms).

As illustrated in FIG. 5, a traveling instruction CS from the integrated controller 5 is supplied to the plurality of zone controllers 4 in parallel (practically in parallel when a time lag is ignored). The identical traveling instruction CS and position information are supplied to the plurality of zone controllers 4 from the integrated controller 5. Each of the plurality of zone controllers 4 determines whether the mover 6 to be driven is present in a unit zone (one of SE1 to SE9) related to the self device based on the traveling instruction CS and the position information from the integrated controller 5. For example, in FIG. 5, the mover 6 is traveling in the unit zones SE1 to SE3, and the zone controllers 4 related to the unit zones SE1 to SE3 determine that the armatures 7 to be driven are present in the unit zones related to the self devices. In this case, the zone controllers 4 related to the unit zones SE1 to SE3 supply motor currents PW to the armatures 7 so that a position of the mover 6 approaches the target position determined by the position instruction of the traveling instruction, and the speed of the mover 6 approaches the target speed determined by the speed instruction of the traveling instruction. Further, in FIG. 5, the zone controllers 4 related to the unit zones SE4 to SE9 where the mover 6 is not traveling determine that the armatures 7 to be driven are not present in the unit zones related to the self devices. In this case, the zone controllers 4 related to the unit zones SE4 to SE9 do not supply the motor currents to the armatures 7.

Further, the zone controller 4 allocated to one area controller 5a (for example, the zone controller 4 with number 0 in FIG. 3) supplies a synchronous signal to the detector 3 just when receiving the traveling instruction CS. Further, the detector 3 supplies a detection signal that represents a detected result of the position information of the mover 6 as a response to the synchronous signal to the zone controllers 4. The zone controllers 4 repeatedly supply the synchronous signals to the detector 3 on a second cycle (for example, 0.1 ms) that is shorter than the first cycle (for example, 1.0 ms) on which the traveling instruction is supplied, and obtain the position information of the mover 6 on the second cycle. The zone controllers 4 control the armatures 7 based on the position information obtained on the second cycle so that the position and the speed of the mover 6 approach the target values, respectively. That is to say, the zone controllers 4 use the position information supplied from the area controllers 5a for the determination whether the mover 6 to be driven is present in the unit zones related to the self devices, and use the position information obtained from the detector 3 for a determination of power values (a motor current) to be supplied to the armatures 7.

Further, when receiving a next traveling instruction CS, the zone controllers 4 supply latest position information of the mover 6 to the area controller 5a according to this traveling instruction CS. That is to say, the zone controllers 4 supply the position information to the area controllers 5a on the first cycle (1.0 ms). The area controllers 5a supply the position information from the zone controllers 4 to the system controller 5b. The system controller 5b uses the latest position information supplied from the area controllers 5a for generating a next traveling instruction. The system controller 5b supplies the latest position information of the mover 6 to the host control device 25. The latest position information of the mover 6 supplied to the host control device 25 can be used for, for example, monitoring.

Figure 6A:
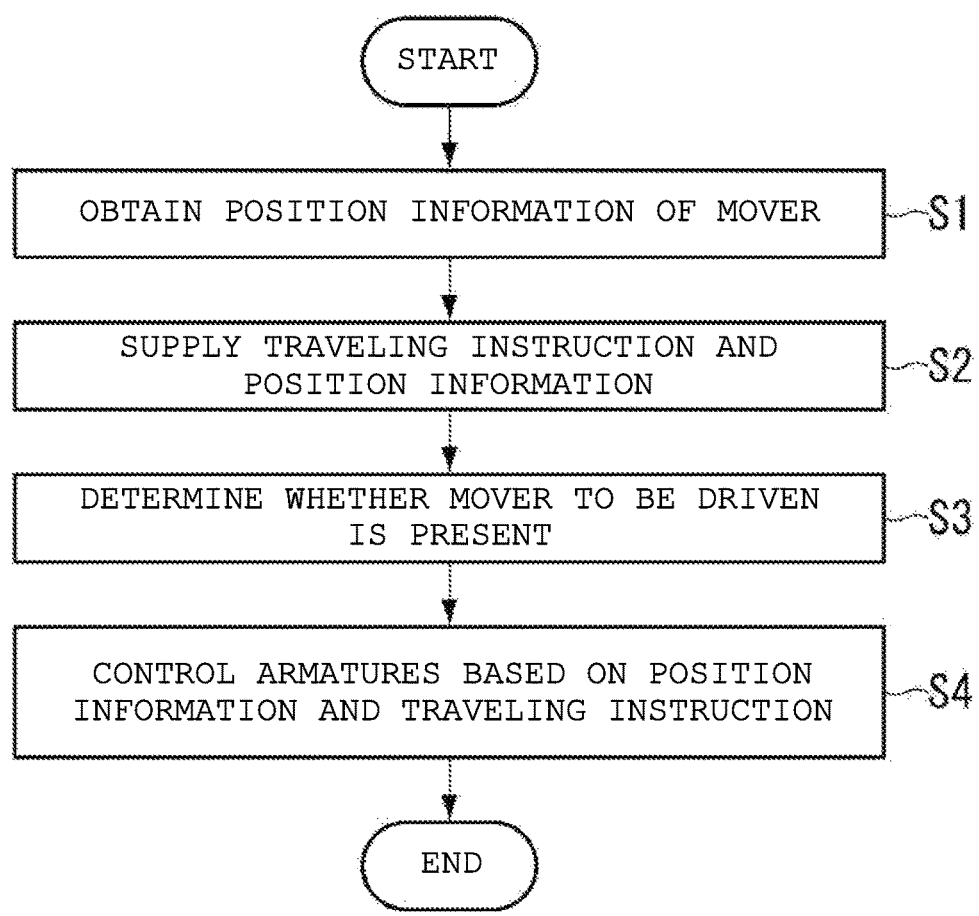
FIG. 6A and FIG. 6B are flowcharts illustrating one example of a control method in the linear motor system.
Figure 6B:
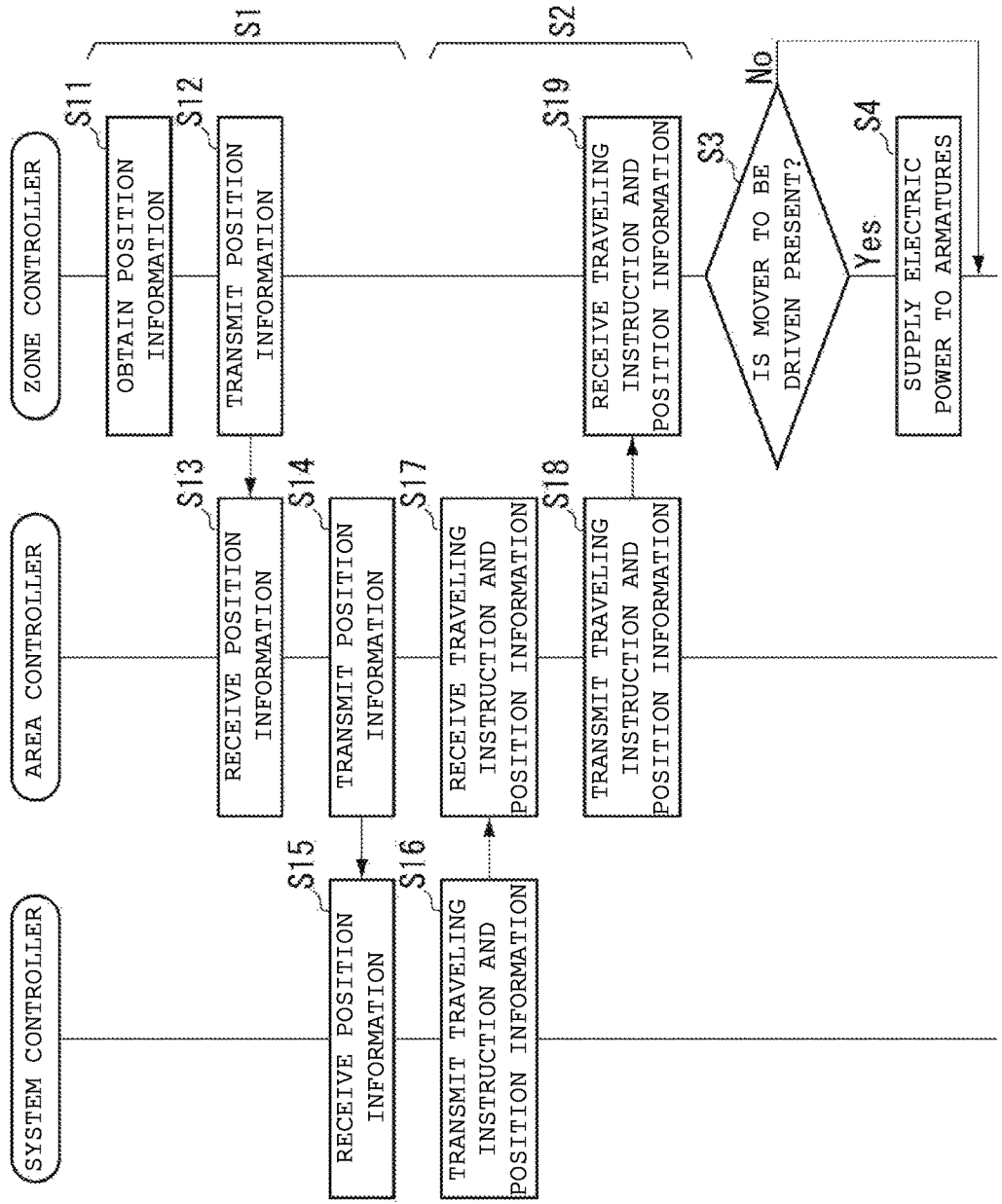

A method for controlling the linear motor system 1A according to this embodiment is described below based on the operation of the linear motor system 1A. FIG. 6A is a flow chart illustrating the method for controlling the linear motor system 1A according to this embodiment. FIG. 6B is a sequence diagram illustrating the operation of the linear motor system 1A corresponding to FIG. 6A. The linear motor system 1A obtains the position information of the mover 6 at step S1. For example, as illustrated in FIG. 6B, the zone controllers 4 obtain the position information from the detector 3 at step S11. The zone controllers 4 transmit the position information to the area controllers 5a at step S12. The area controllers 5a receive the position information at step S13. Further, the area controllers 5a transmit the position information to the system controller 5b at step S14. The system controller 5b receives the position information at step S15. The linear motor system 1A supplies the traveling instruction and the position information at step S2 in FIG. 6A. For example, as illustrated in FIG. 6B, the system controller 5b transmits the traveling instruction and the position information to the area controllers 5a at step S16. The area controllers 5a receive the traveling instruction and the position information at step S17. Further, the area controllers 5a transmit the traveling instruction and the position information to the zone controllers 4 at step S18. The zone controllers 4 receive the traveling instruction and position information at step S19. The linear motor system 1A determines whether the mover to be driven is present at step S3 in FIG. 6A. For example, as illustrated in FIG. 6B, the plurality of zone controllers 4 determines whether the mover 6 to be driven is present in the unit zones related to the self devices based on the traveling instruction and the position information supplied from the system controller 5b. The linear motor system 1A controls the armatures 7 based on the position information and the traveling instruction at step S4 in FIG. 6A. For example, as illustrated in FIG. 6B, the determination is made that the mover 6 to be driven is present in the unit zones related to the zone controllers 4 (Yes at step S3), the zone controllers 4 control power values (the motor currents) to be supplied to the armatures 7 based on the latest position information and traveling instruction obtained from the detector 3 so that the position and the speed of the mover 6 reaches the target values at step S4. Further, when the determination is made that the mover 6 to be driven is not present in the unit zone to be controlled by the self device (No at step S3), the zone controller 4 does not execute a process at step S4.

Figure 7:
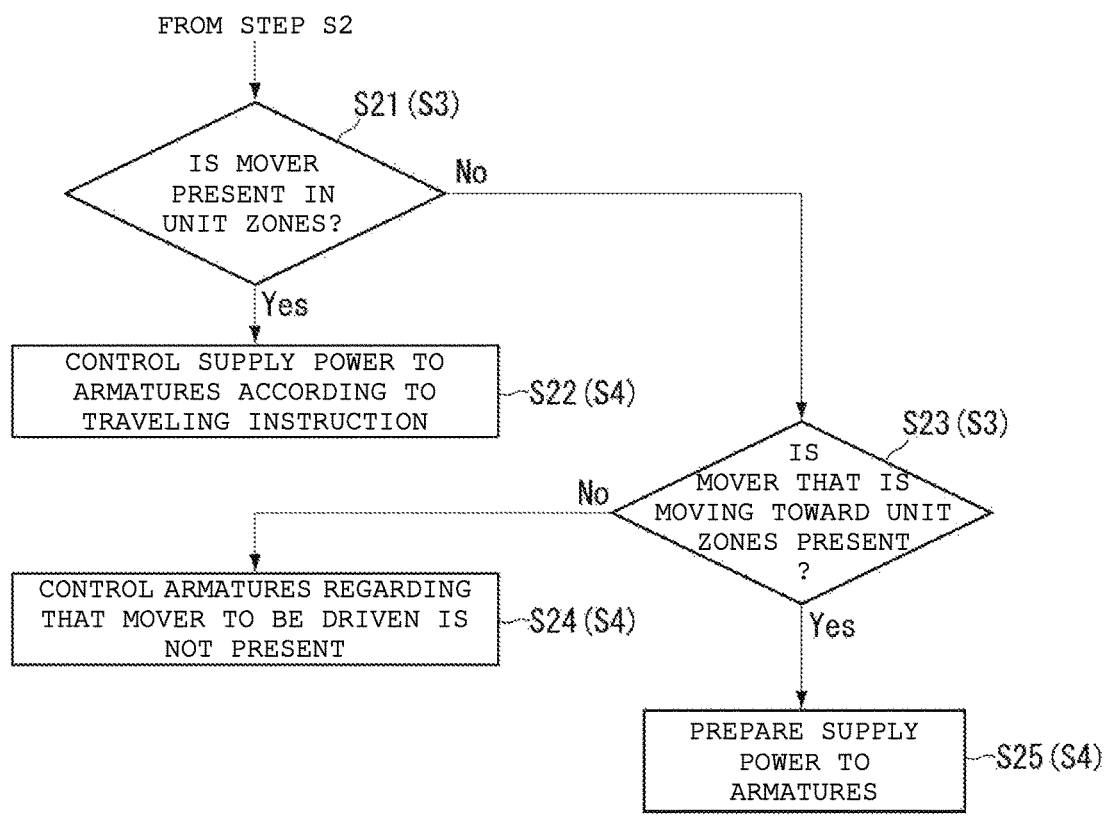
FIG. 7 is a flow chart illustrating examples of a process at step S3 and a process at step S4 in FIG. 6A and FIG. 6B.

FIG. 7 is a flow chart illustrating examples of a process at step S3 and a process at step S4 in FIG. 6A and FIG. 6B. The zone controllers 4 determine whether the mover 6 is present in the related unit zones (the unit zones related to the self devices) at step S21 following step S2. The process at step S21 is a part of the process at step S3 illustrated in FIG. 6A. The zone controllers 4 make determinations at step S21 based on the traveling instruction and the position information supplied from the system controller 5b. When the zone controllers 4 determine that the mover 6 is present in the unit zones related to the self devices (Yes at step S21), the zone controllers 4 control the supply powers (the motor currents) to the armatures 7 at step S22 according to the traveling instructions. The process at step S22 is a part of the process at step S4 in FIG. 6A.

When the determination is made that the mover 6 is not present in the related unit zones (No at step S21), the zone controllers 4 determine at step S23 whether the mover 6 related to the next traveling instruction is moving toward the unit zones related to the self devices. Step S23 is a part of the process at step S3 in FIG. 6A. The zone controllers 4 calculate distances between start points of the unit zones related to the self devices and the mover 6 using, for example, the target position of the mover 6 specified by the traveling instructions supplied from the area controllers 5a and the positions of the self devices. Further, the zone controllers 4 calculate times until the mover 6 reaches start points of the unit zones related to the self devices using the calculated distances and the target values of the speed of the mover 6 included in the traveling instructions supplied from the area controllers 5a. Further, the zone controllers 4 determine whether the mover 6 reaches the start points of the unit zones related to the self devices until next traveling instruction is supplied based on the calculated times and the first cycle in which the traveling instruction is supplied. When determining that the mover 6 related to the next traveling instruction is moving toward the related unit zones (Yes at step S23), the zone controllers 4 prepare (secure) supply powers to the armatures 7 at step S25. The process at step S25 is a part of the process at step S4 in FIG. 6A. For example, the zone controllers 4 store an electric power necessary for driving the mover 6 related to the next traveling instruction, namely, at least a part of the electric powers to be supplied to the armatures 7 in an integrator, a capacitor or the like. Further, when determining that the mover 6 related to the next traveling instruction does not move toward the related unit zones (No at step S23), the zone controllers 4 regard that the mover 6 to be driven is not present and control the armatures 7 at step S24. For example, the zone controllers 4 ignore the traveling instruction and do not supply motor currents to the armatures 7. The process at step S24 is a part of the process at step S4 in FIG. 6A. The zone controllers 4 determine whether the mover 6 to be driven is present (a process at step S3) according to the process at step S21 and the process at step S23. The process at step S21 and the process at step S23 are examples of the process at step S3, and the process at step S3 is not limited to the examples. For example, the process at step S23 may be omitted in the process at step S3, or another process may be added to the process at step S3.

Figure 8A:
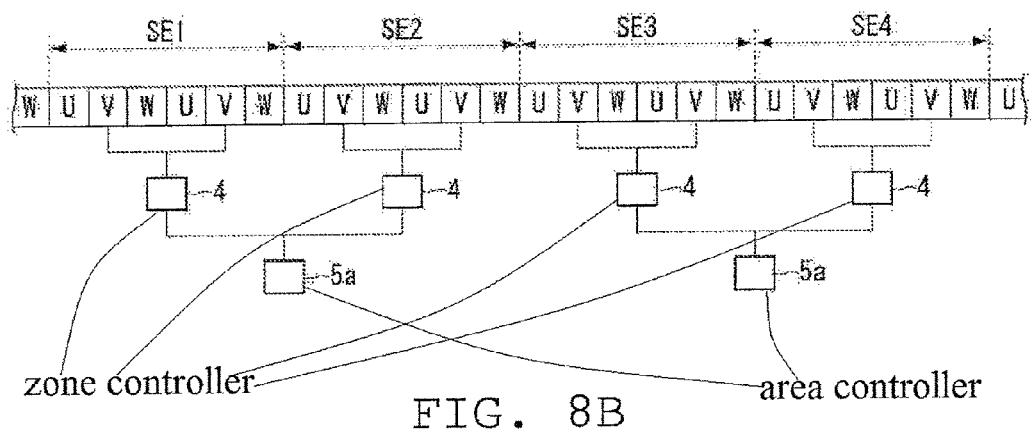
FIG. 8A to FIG. 8C are diagrams illustrating a disposition example of armatures.
Figure 8B:
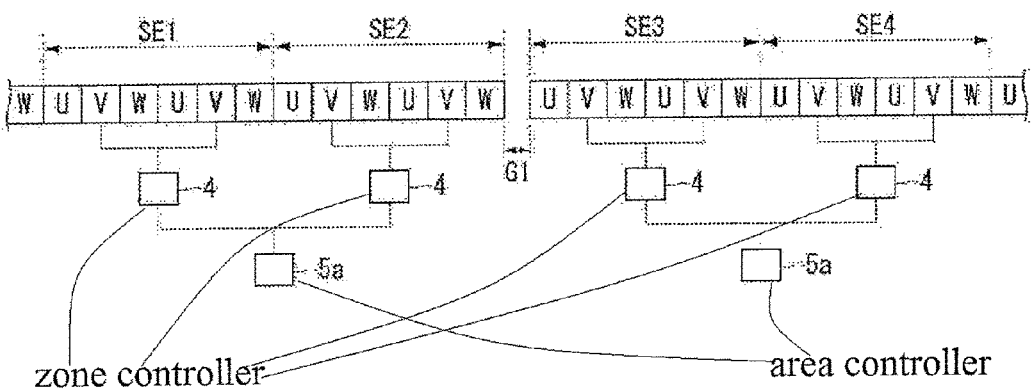
Figure 8C:
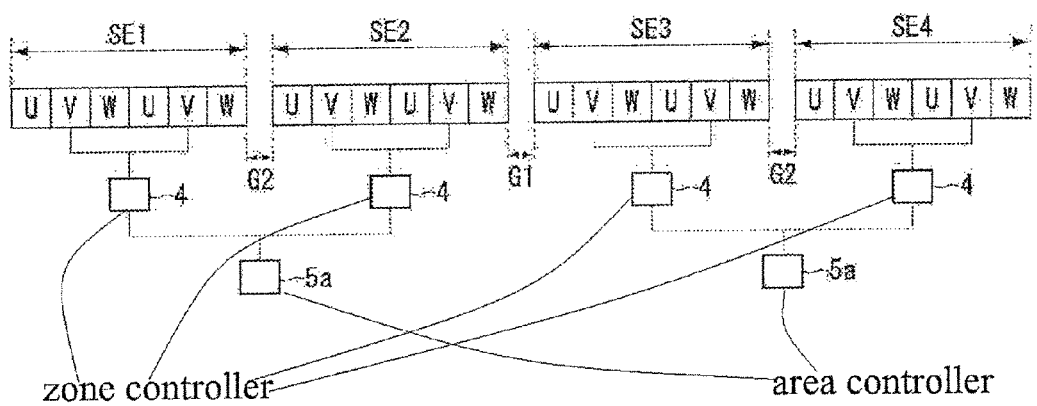

FIG. 8A to FIG. 8C are diagrams illustrating examples of a disposition of the armatures 7. In FIG. 8A, the armatures 7 in the unit zone SE1 and the armatures 7 in the unit zone SE2 are disposed so as to be close to each other and are disposed continuously in the unit zones related to one area controller 5a (the unit zone SE1 and a unit zone SE2). Similarly, the armatures 7 are disposed continuously in the unit zones related to the adjacent area controller 5a (the unit zone SE3 and the unit zone SE4). Further, the armatures 7 are disposed in the unit zone SE2 and the unit zone SE3 so as to be close to each other. In the example of FIG. 8A, the armatures 7 are disposed continuously and closely in the unit zone related to one area controller 5a (for example, the unit zone SE2) and the unit zone related to the next area controller 5a (for example, the unit zone SE3).

FIG. 8B is a diagram illustrating the example where some of the armatures 7 are disposed discretely. In this example, the armatures 7 are disposed continuously in the unit zones related to the respective area controllers 5a similarly to FIG. 8A. In this example, a gap G1 across which the mover 6 can move is preset between the unit zones related to the different area controllers 5a (the unit zone SE2 and the unit zone SE3). In such a manner, the armatures 7 may be disposed discretely on a part of the movement path of the mover 6.

FIG. 8C is a diagram illustrating another example in which the armatures 7 are disposed discretely. In this example, the armatures 7 are disposed continuously in each unit zone related to each zone controller 4. Further, a gap G2 is provided between the end armature 7 in one unit zone (for example, the unit zone SE1) and the end armature 7 in the adjacent unit zone (for example, the unit zone SE2) so that the mover 6 can move across these end armatures 7 in the two unit zones. In such a manner, the armatures 7 may be disposed discretely on at least a part of the movement path of the mover 6. Further, when the plurality of armatures 7 is disposed in the unit zones, the armatures 7 may be disposed discretely in at least one unit zone. Further, the disposition of the armatures 7 may be such that two or more of the above examples may be combined.

Second Embodiment

Figure 9:
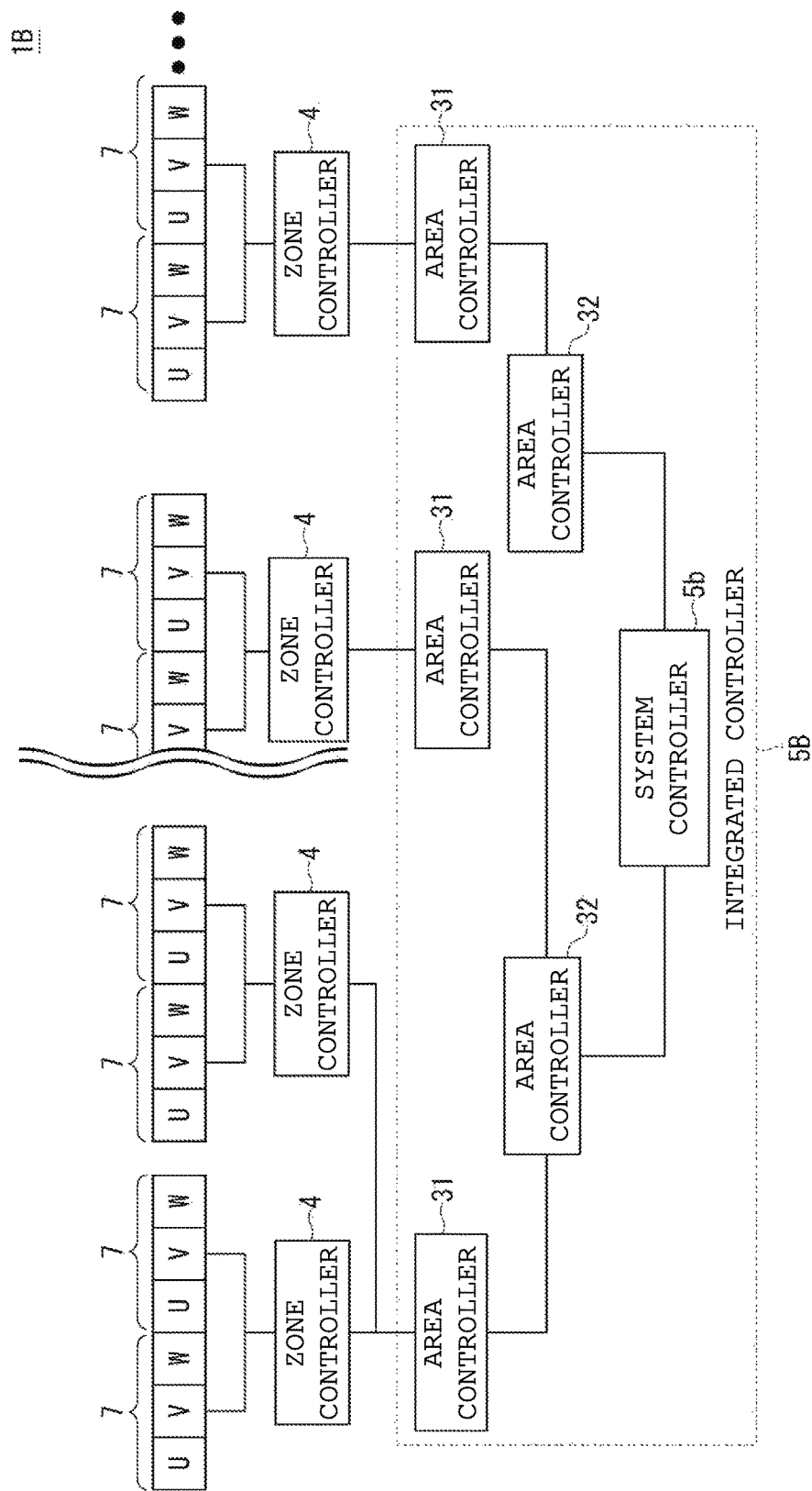
FIG. 9 is a conceptual diagram illustrating the linear motor system according to a second embodiment.

A second embodiment is described. In this embodiment, components similar to the components in the above embodiment are denoted by the same reference symbols, and description thereof is omitted or simplified. FIG. 9 is a conceptual diagram illustrating a linear motor system 1B according to the second embodiment. In this embodiment, an integrated controller 5B of the linear motor system 1B includes a plurality of first-layer area controllers 31, a plurality of second-layer area controllers 32, and a system controller 5b. The first-layer area controllers 31 are connected to a plurality of zone controllers 4 similarly to the first embodiment. The second-layer area controllers 32 are connected to the plurality of first-layer area controllers 31, and totally control the plurality of first-layer area controllers 31. Further, the system controller 5b is connected to the plurality of second-layer area controllers 32, and totally controls the plurality of second-layer area controllers 32. That is to say, in the linear motor system 1B, the area controllers are hierarchized, and the zone controllers 4 are connected to the system controller 5b via the first-layer area controllers 31 and the second-layer area controllers 32. In the linear motor system 1B, an armature 7 to be controlled can be easily annexed, and can be easily enlarged.

Third Embodiment

Figure 10:
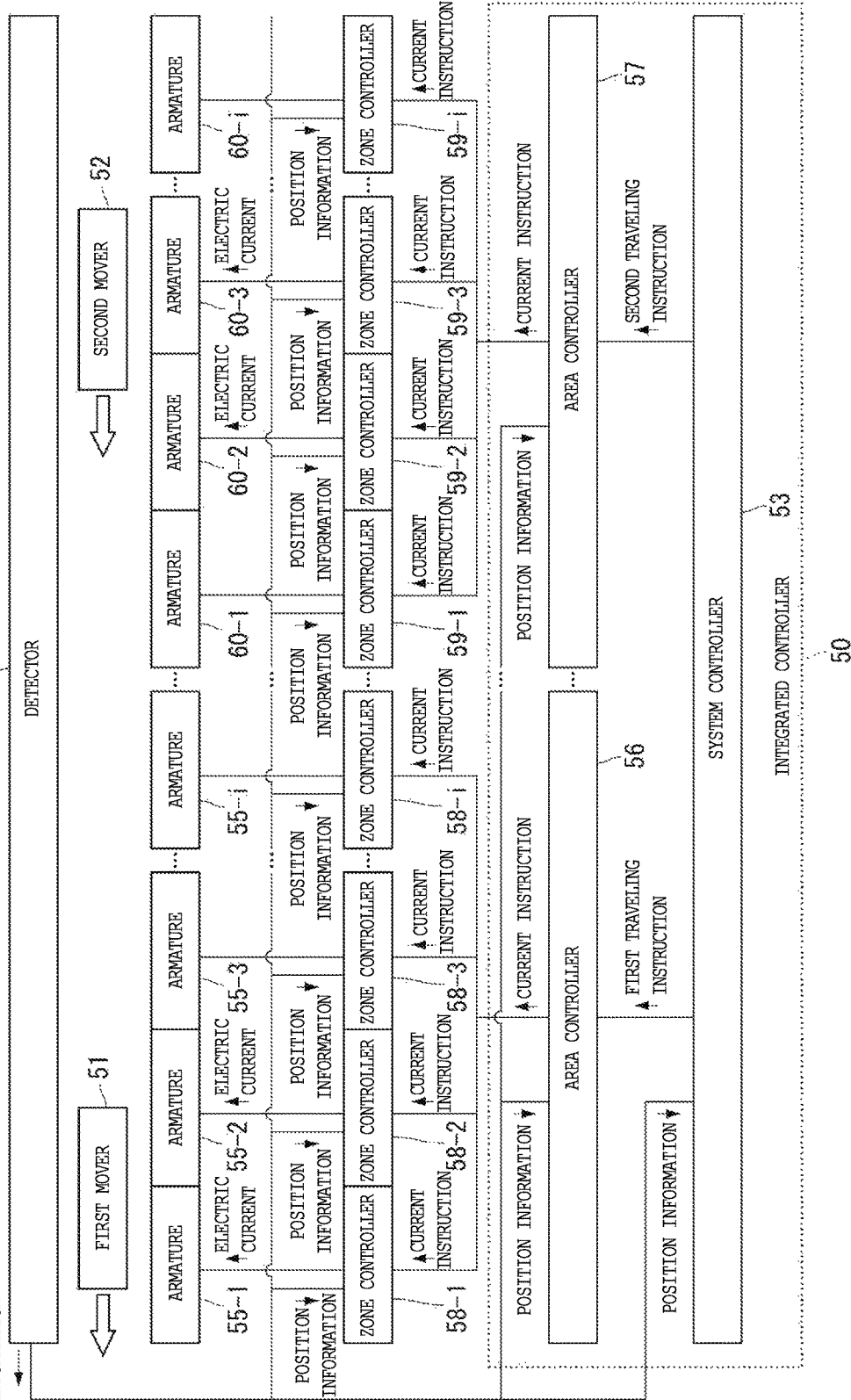
FIG. 10 is a block diagram illustrating the linear motor system according to a third embodiment.

A third embodiment is described below. FIG. 10 a block diagram illustrating a linear motor system 1C according to the third embodiment. In this embodiment, an integrated controller 50 generates current instructions representing values of electric currents to be supplied to armatures as traveling instructions. Although an example in which a plurality of movers (a first mover 51 and a second mover 52) are provided is described, the number of the movers may be one, or two or more.

A system controller 53 of the integrated controller 50 manages traveling instructions related to the plurality of movers. For example, a detector 54 detects position information (for example, a coordinate) of the first mover 51, and supplies the detected position information of the first mover 51 to the system controller 53. The system controller 53 determines an area controller (for example, an area controller 56) that is related to the armature which drives the first mover 51 (for example, an armature 55-1 and an armature 55-2) based on the position information of the first mover 51 supplied from the detector 54. Further, the system controller 53 generates a first traveling instruction for moving the first mover 51 to a target position based on the position information of the first mover 51 and a position instruction that represents the target position of the first mover 51. The system controller 53 supplies the generated first traveling instruction to the area controller 56. The system controller 53 generates a second traveling instruction related to the second mover 52 similarly for the second mover 52, and supplies the second traveling instruction to an area controller 57 related to the second mover 52.

Zones related to the area controller 56 are provided with a plurality of zone controllers 58-1, 58-2, . . . , 58-i (hereinafter, generally called a plurality of zone controllers 58), and a plurality of armatures 55-1, 55-2, . . . , 55-i (hereinafter, generally called a plurality of armatures 55). Symbols 1, 2, . . . i are indexes representing a correspondence relationship between the zone controllers and the armatures, and the symbol i is any integer of 2 or more. The zone controllers and the armatures having the same indexes establish the correlation relationship. For example, the zone controller 58-1 and the armature 55-1 establish the correlation relationship, and the zone controller 58-2 and the armature 55-2 establish the correlation relationship.

The area controller 56 generates a current instruction based on the first traveling instruction. The current instruction (a power instruction) is an instruction (information) that represents a value of an electric current (an electric power) when the plurality of zone controllers 58 related to the area controller 56 supplies the electric currents (the electric powers) to the armatures. The area controller 56 generates the identical current instruction for the plurality of zone controllers 58 related to the self device, and collectively supplies the generated current instruction to the plurality of zone controllers 58.

The plurality of zone controllers 58 controls whether the electric current of the value determined by the current instruction is supplied to the armatures based on a result of determining whether the mover to be driven (for example, the first mover 51) is present in the related unit zones. For example, the plurality of zone controllers 58 obtains the position information of the first mover 51 from the detector 54, and determines whether an electric current is supplied to the armatures from the self device based on the position information. For example, the zone controllers 58-1 and 58-2 determine that the first mover 51 to be driven is present in the unit zones related to the self device based on the position information of the first mover 51, and supplies the electric current of the value determined by the current instruction to the related armatures 55-1 and 55-2. Further, the zone controllers 58-3, . . . , 58-i determine that the first mover 51 to be driven is not present in the unit zones related to the self devices based on the position information of the first mover 51, and do not supply the electric current to the related armatures 55-3, . . . , 55-i.

Much the same is true on the second mover 52. The area controller 57 generates the identical current instruction according to the second mover 52, and collectively supplies the generated current instruction to a plurality of zone controllers 59-1, 59-2, . . . , 59-i (hereinafter, generally called a plurality of zone controllers 59). The current instruction related to the second mover 52 is occasionally different from or the same as the current instruction related to the first mover 51. The plurality of zone controllers 59 obtains the position information of the first mover 51 from the detector 54, and determines whether the electric current is supplied to the armatures from the self devices. When the determination is made that the electric current is supplied to the armatures from the self devices, the plurality of zone controllers 59 supplies the electric current determined by the current instruction to the related armatures. When the determination is made that the electric current is not supplied to the armatures from the self devices, the plurality of zone controllers 59 does not supply the electric current to the related armatures. For example, the zone controllers 59-2 and 59-3 supply the electric current to the armatures 60-2 and 60-3, and the other zone controllers (for example, 59-1 and 59-i) do not supply the electric current to the armatures (for example, 60-1 and 60-i).

Figure 11:
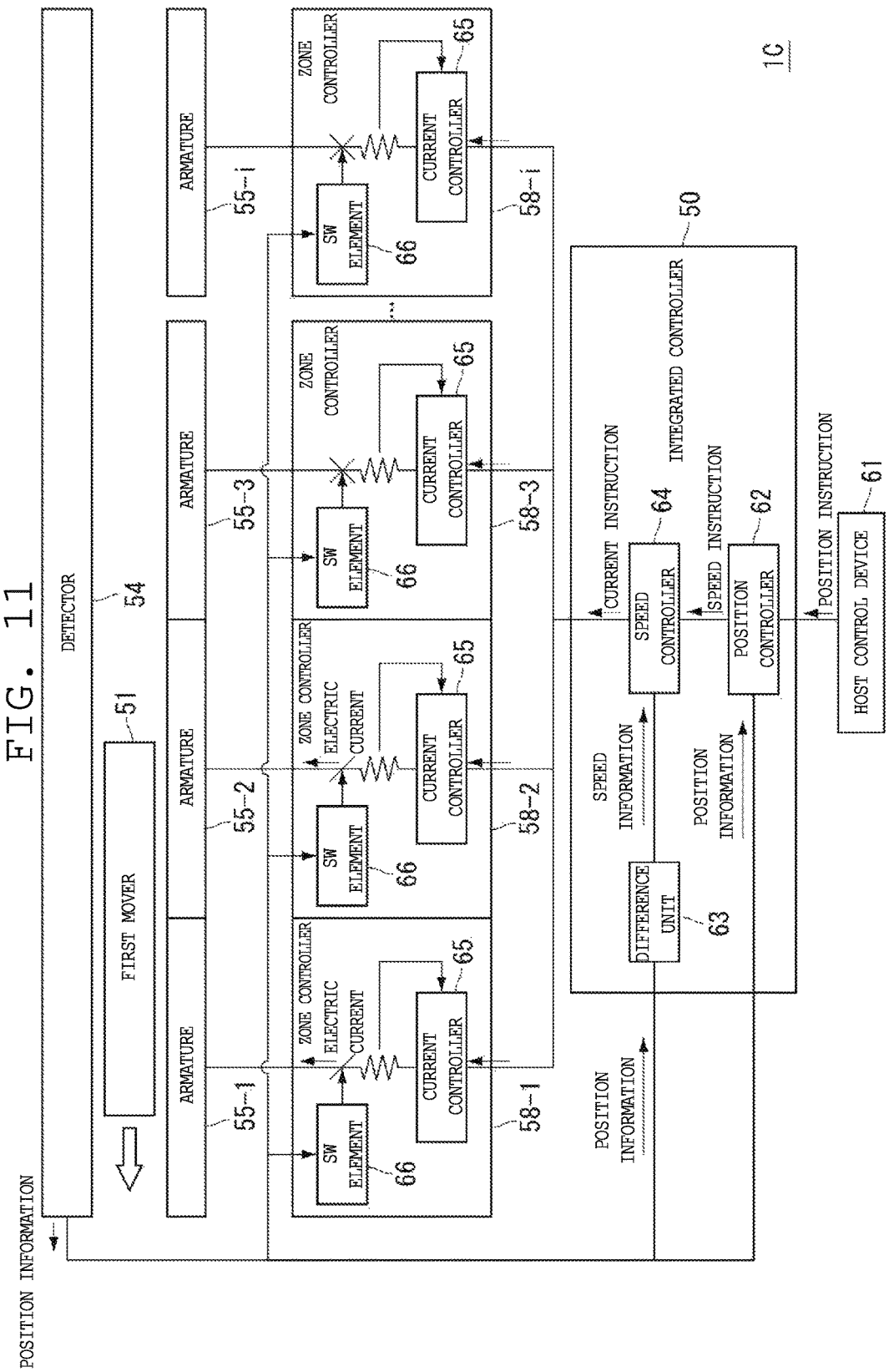
FIG. 11 is a block diagram illustrating a zone to be controlled by one area controller in a configuration of the linear motor system according to the third embodiment.

FIG. 11 is a block diagram illustrating zones to be controlled by one area controller in a configuration of the linear motor system according to this embodiment. An integrated controller 50 is, for example, a motion controller, and obtains a position instruction from a host control device 61. The integrated controller 50 generates the current instruction that represents the value of the electric current to be supplied to the armatures as the traveling instruction. The integrated controller 50 supplies the current instruction to the plurality of zone controllers 58 on a first cycle (for example, 1.0 ms) based on the position information detected by the detector 54. The integrated controller 50 includes a position controller 62, a difference unit 63 (a differentiator), and a speed controller 64.

The position controller 62 generates a speed instruction that represents a target speed of the mover based on a position instruction that represents a target position of the mover (for example, the first mover 51) and the position information supplied from the detector 54. For example, the detector 54 detects the position information of the first mover 51 on a second cycle (a sampling time), and the position controller 62 receives the detected position information on the first cycle. The second cycle is set to a cycle, which is shorter than the first cycle (1.0 ms), (for example, 0.1 ms). For example, every time the detector 54 detects the position information of the mover at a plural number of times (for example, 10 times), the position controller 62 receives the position information once. The position controller 62 generates the speed instruction on the first cycle (for example, 1.0 ms) based on the position instruction and the position information. Further, the position controller 62 supplies the generated speed instruction to the speed controller 64 on the first cycle.

Further, the difference unit 63 generates the speed information of the mover (for example, the first mover 51) based on the position information supplied from the detector 54. For example, the difference unit 63 receives the position information from the detector 54 on the second cycle (for example, 0.1 ms), and calculates a difference between the previous position information and the position information at this time so as to generate speed information. The difference unit 63 generates the speed information, for example, on the first cycle, and supplies the generated speed information to the speed controller 64 on the first cycle (for example, 1.0 ms).

The speed controller 64 generates a current instruction based on the speed instruction generated by the position controller 62 and the speed information of the mover generated from the position information received from the detector 54 on the first cycle. For example, the speed controller 64 obtains the speed information from the difference unit 63 on the first cycle (for example, 1.0 ms), and generates the current instruction on the first cycle. The speed controller 64 supplies the generated current instruction collectively to the plurality of (all) zone controllers 58 (58-1, 58-2, . . . , 58-i) on the first cycle. A control cycle of the generation of the current instruction by the speed controller 64 may be earlier than a control cycle of the generation of the speed instruction by the position controller 62.

The integrated controller 50 supplies the current instruction to the plurality of zone controllers 58 on the first cycle based on the position information detected by the detector 54. The position information may be supplied to at least one of the position controller 62 and the speed controller 64 from the detector 54 via the zone controllers 58. Further, the difference unit 63 does not have to be provided to the integrated controller 50, and may be provided to places other than the integrated controller 50 (for example, the detector 54). Further, the speed information may be calculated based on a result of detecting an acceleration of the first mover 51.

The zone controllers 58 determine whether an electric current is supplied to the armatures on a second cycle (0.1 ms) that is shorter than the first cycle (for example, 1.0 ms) based on the position information detected by the detector 54. Each of the zone controllers 58 is formed by a current controller 65, and a switching element 66 (hereinafter, the SW element 66). The current controller 65 sets the value of the electric current to be supplied to the armature to a value defined by the current instruction. For example, the current controller 65 of the zone controller 58-1 is electrically connected to the armature 55-1, and makes feedback control using the value of the electric power to be output from the self device. As a result, the current controller 65 sets the value of the electric current when the power is supplied to the armature 55-1 to a value defined by the current instruction.

The SW element 66 switches a state of the path of the electric current to be supplied to the armature between a conductive state (ON) and a cutoff state (OFF). The SW element 66 is provided between the current controller 65 and the armature. For example, the SW element 66 of the zone controller 58-1 is provided between the current controller 65 and the armature 55-1. The SW element 66 controls the switching between the conductive state and the cutoff state based on the position information to be supplied from the detector 54 on the second cycle (for example, 0.1 ms). For example, the detector 54 and the zone controllers 58 are connected so as to be directly communicable with each other. The zone controllers 58 receive the position information from the detector 54 on the second cycle (for example, 0.1 ms).

A determiner (not illustrated) of the zone controller 58 supplies a predetermined voltage to a gate electrode of the SW element 66 based on the position information. For example, when the value representing the position information is out of a predetermined range, the determiner does not apply the voltage to the gate electrode of the SW element 66, and the SW element 66 is in the cutoff state in this case. The predetermined range, for example, is predetermined according to the position of the unit zone related to the zone controller (for example, the zone controller 58-1). When the value of the position information is within the predetermined range, the mover to be driven is present in the unit zone related to the zone controller (for example, the zone controller 58-1). When the value of the position information is within the predetermined range, the determiner supplies a predetermined voltage to the gate electrode of the SW element 66, so that the SW element 66 is switched from the cutoff state into the conductive state. When the SW element 66 is in the conductive state in the zone controller 58-1, an electric current is applied from the current controller 65 to the armature 55-1 so as to drive the first mover 51.

In this embodiment, loops of the position control and the speed control are performed by the integrated controller 50 (a motion controller). Only the current instruction (an instruction value of the electric current) is transmitted to the zone controller 58 (a servo amplifier), and the zone controller 58 makes only the current control. The state of the mover is fed back to the integrated controller 50, and the zone controller 58 can switch the supply of the electric current at a highspeed. For this reason, a seamless operation can be realized. In order to realize the seamless operation, the second cycle does not have to be always made to be shorter than the first cycle, and the first cycle may be the same as the second cycle.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A linear motor system comprising:
   a plurality of armatures that are disposed along a movement path of a mover continuously or discretely;
   a detector that detects position information of the mover in the movement path;
   zone controllers that are provided to a plurality of unit zones of the movement path in one-to-one correspondence and control the armatures disposed on the unit zones, respectively; and
   an integrated controller that collectively supplies an identical traveling instruction relating to the movers to the plurality of zone controllers provided to the movement path based on the position information detected by the detector and controls the plurality of zone controllers, wherein the zone controllers determine whether the mover to be driven is present in the related unit zones based on the traveling instruction, and control the plurality of armatures based on determined results.

2. The linear motor system according to claim 1, wherein when the mover is present in the related unit zones, the zone controllers control electric powers to be supplied to the plurality of armatures according to the traveling instruction.

3. The linear motor system according to claim 2, wherein when the mover is not present in the related unit zones, the zone controllers determine whether the mover related to the next traveling instruction is moving toward the related unit zones.

4. The linear motor system according to claim 3, wherein the zone controllers determine whether the mover related to the next traveling instruction is moving toward the related unit zones based on the previous traveling instruction.

5. The linear motor system according to claim 3, wherein when the determination is made that the mover related to the next traveling instruction is moving toward the related unit zones, the zone controllers store electric powers to be supplied to the plurality of armatures in advance.

6. The linear motor system according to claim 3, wherein when determining that the mover related to the next traveling instruction is not moving toward the related unit zones, the zone controllers ignore the traveling instruction.

7. The linear motor system according to claim 1, wherein the plurality of zone controllers obtain the position information detected by the detector, and supplies at least a part of the obtained position information to the integrated controller,
the integrated controller supplies the position information obtained from the plurality of zone controllers to the plurality of zone controllers.

8. The linear motor system according to claim 7, wherein the integrated controller supplies the position information obtained from the plurality of zone controllers as well as the next traveling instruction to the plurality of zone controllers.

9. The linear motor system according to claim 1, wherein the integrated controller includes
area controllers that are provided correspondingly to the zone controllers in the two or more unit zones sequentially disposed on movement path, and
a system controller that supplies a common instruction including the traveling instruction to the zone controllers related to the area controllers via the area controllers.

10. The linear motor system according to claim 9, wherein the zone controllers related to the area controllers obtain the position information detected by the detector, and supply at least a part of the obtained position information to the system controller via the area controllers,
the system controller supplies the position information obtained from the zone controllers related to the area controllers to the zone controllers related to the area controllers via the area controllers.

11. The linear motor system according to claim 9, wherein the zone controllers related to the area controllers are connected to each other by a daisy chain mode.

12. The linear motor system according to claim 1, wherein the integrated controller generates a current instruction representing a value of the electric current to be supplied to the armatures as the traveling instruction,
the zone controllers control whether the electric current whose value is determined by the current instruction is supplied to the armatures based on results of determining whether the mover to be driven is present in the related unit zones.

13. The linear motor system according to claim 12, wherein the integrated controller supplies the current instruction to the plurality of zone controllers on a first cycle based on the position information detected by the detector,
the zone controllers determine whether the electric current is supplied to the armatures based on the position information detected by the detector on a second cycle that is shorter than the first cycle.

14. The linear motor system according to claim 13, wherein the integrated controller includes
a position controller that generates a speed instruction representing a target speed of the mover on the first cycle based on the position instruction representing the target position of the mover and the position information supplied from the detector, and
a speed controller that generates the current instruction on the first cycle based on the speed information of the mover generated from the speed instruction and the position information supplied from the detector.

15. The linear motor system according to claim 13, wherein each of the zone controllers includes
a current controller that sets a value of the electric current to be supplied to the armatures to a value determined by the current instruction, and
a switching element that switches a state of the path of the electric current to be supplied to the armatures between a conductive state and a cutoff state,
wherein the switching element controls the switching between the conductive state and the cutoff state on the second cycle based on the position information supplied from the detector.

* * * * *